July 25, 1972   R. D. S. CRICK   3,679,527
LAMINATED STRUCTURES
Filed Aug. 21, 1969
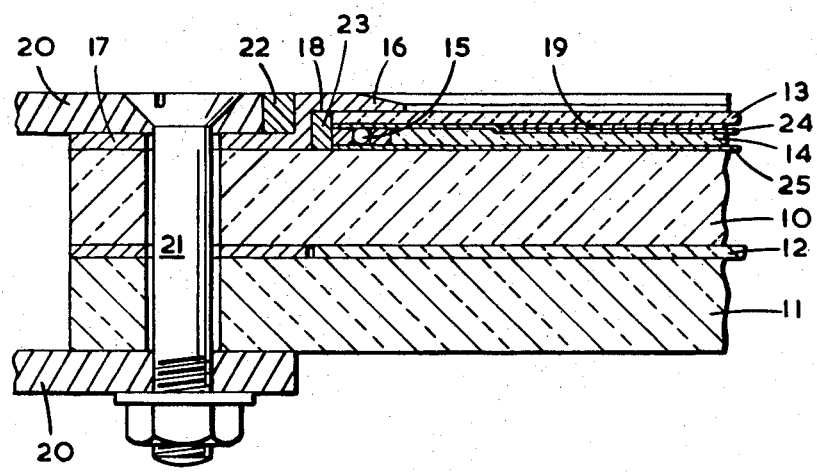

3,679,527
LAMINATED STRUCTURES
Roger Dudley Salway Crick, Luton, England, assignor to The English Electric Company Limited, London, England
Filed Aug. 21, 1969, Ser. No. 851,928
Claims priority, application Great Britain, Aug. 23, 1968, 40,354/68
Int. Cl. B32b 1/04; B44f 1/00
U.S. Cl. 161—5                                   7 Claims

ABSTRACT OF THE DISCLOSURE

A laminated structure, for example an aircraft window, includes two rigid layers separated by a layer of a liquid or near-liquid (jelly-like) material. Since a liquid or jelly-like interlayer cannot transmit shear loads between the rigid layers, the use of such an interlayer material eliminates delamination of the structure. A barrier layer may be provided between the rigid layers and the interlayer to prevent chemical interaction between the layers which could inhibit any necessary curing of the interlayer material.

---

This invention relates to laminated structures.

According to the invention, a laminated structure includes two substantially rigid layers with an interlayer of liquid or jelly-like material between them, and means for maintaining the substantially rigid layers a predetermined distance apart, said substantially rigid layers being arranged for limited free movement relative to each other except in the direction of restraint by said means.

The invention is applicable to any laminated structure, especially where delamination is a problem. The interlayer is of a material such that, under the applied loads for which the structure is designed, the interlayer carries substantially no shear loads and also has the property of wetting the adjacent surfaces of the associated rigid layers (or "plies"). The invention is applicable to transparent, translucent and opaque structures, however, the remainder of this specification is related to the specific case of transparencies for aircraft. From the following discussion the problems to be overcome and the general method by which the invention overcomes these problems, will be apparent not only in relation to aircraft transparencies but also to other laminated structures.

The majority of aircraft cockpit optical transparencies or windows today, at least on pressurised aircraft, are laminated structures. They consist of various layers or plies of structural materials consisting of either glass and/or of rigid plastics materials such as acrylic, laminated together with relatively soft plastics interlayers such as PVB (polyvinyl butyral) or other material. They often also incorporate an electrical heating element, usually applied to one of the rigid plies to provide anti-icing andor de-misting properties. There are several reasons for this type of construction, examples being:

(1) the need to enclose the electrical heating film;
(2) the requriement for flush fitting (glass cannot easily be rebated);
(3) the requirement for fail-safe structures, i.e. if one structural ply fails for any reason, there should be a second structural element capable of carrying the pressure loads; and
(4) laminated structures are more efficient under bird impact conditions.

However, a major problem with laminated constructions has been that they tend to delaminate in service. This problem arises because the usual interlayer materials are of a type that will transmit shear loads to a greater or lesser extent, depending on the variation of their properties with temperature. Hence, stresses are set up at the interfaces between the rigid plies and the interlayers when the rigid plies tend to move relative to each other, due to pressure loads, thermal gradients and unmatched coefficients of expansion etc. Often the bond between the interlayer and the rigid plies, using the materials and techniques at present available, is not sufficient to withstand these stresses, and delamination therefore occurs.

The problem is particularly severe at interfaces near the outside of the transparency, i.e. towards the outside of the aircraft; and although, on cockpit side windows that normally only require internal demisting, an interlayer can often be avoided in that position, a forward facing windscreen that requires to be anti-iced with an electrical heating film, must carry the heating film very near the outer surface and hence must have a thin outer rigid ply. However, the problem of delamination does not necessarily only occur adjacent to thin outer plies but may occur at any interface between a rigid ply and an interlayer.

An object of this invention is to eliminate this problem, by using interlayer materials which, at least at the rates of loading applicable to normal aircraft operation, carry substantially no shear loads, and which also possess the property of wetting the surfaces of the rigid plies rather than adhering to them in the normal sense. Suitable liquids (whether they are of low viscosity or high viscosity, such as jelly-like materials) can be used as the interlayer materials.

This type of interlayer need only be used at the interfaces that tend to delaminate, conventional interlayers being used elsewhere. Alternatively, they may be used at all positions between rigid layers in a laminated structure.

For simplicity, the following detailed description of one aircraft transparency incorporating features of the invention, applies only to their use at the outer interlayer of a multiply transparency; this description is given by way of example and with reference to the accompanying drawing, which is a sectional view of a portion of the transparency near one edge thereof. The drawing is schematic, and is not intended to indicate the relative thicknesses of the layers.

The window includes two substantially rigid layers 10 and 11 of glass, acrylic, polycarbonate or other suitable transparent material, separated by a conventional interlayer 12 of a material such as PVB. An outer layer 13, of glass, acrylic, polycarbonate or other suitable rigid transparent material, much thinner than the layers 10 and 11, is separated from the adjacent rigid layer 10 by an interlayer 14 of low or high viscosity liquid. A peripheral seal 15 is provided between the layers 10 and 13 if the interlayer 14 is a low-viscosity liquid, and may be provided if the interlayer 14 is a high viscosity liquid. The seal 15 may be of any suitable kind.

The layers 10 and 13 are maintained a predetermined distance apart at the edges by the seal 15 and a retaining lip 16 of a peripheral frame 17. Any other suitable means for maintaining this spacing between the layers 10 and 13 may however be used instead, provided that the means employed permits freedom of relative movement between the layers 10 and 13 in a direction substantially parallel to the adjacent surfaces of the layers 10 and 13. This is achieved in the present case by providing a space 18 around the periphery of the seal and layer 13 so that the latter can "float" relative to the layer 10. Clearance is therefore provided to allow for expansion and contraction.

The lip 16 of the frame 17 cannot be sealed to the outer layer 13. Hence, during changes in altitude of the aircraft, air can move into and out of the space 18, possibly carrying moisture into the space. At low temperatures the space 18 may, therefore, become filled with a block of ice and the advantages of providing the space 18 will then be lost.

To overcome this problem, the space 18 may be filled with a block 23 of waterproof, unicellular, flexible foam material which will remain flexible at low temperatures and will not deteriorate with age or changes in atmospheric conditions. The foam material will then substantially exclude moisture from the space 18, thereby ensuring that the layer 13 remains free to "float" as explained above.

The material of the interlayer 14 must also be such as to permit this relative movement to occur without undue restraint, and it must also be such that it will always remain in intimate contact with the adjacent surfaces of the layers 10 and 13, for example by wetting the surfaces, so as to prevent air entering at the interfaces. Also, the properties, particularly the viscosity or shear-carrying properties, of the interlayer material must not appreciably change with age or with changes in atmospheric environment, particularly temperature. For example, it may, in some applications, be necessary for the interlayer material to retain its liquid state over a temperature range of 120° C. to −60° C. The material must, of course, be effectively transparent in the visible wavelengths, and ideally, is colourless. It must also have a refractive index approximately equal to that of the rigid layers. Examples of typical suitable material include water-white silicone fluids such as Midland Silicones Ltd.'s MS. 510 for low-viscosity liquid interlayers and Midland Silicones Ltd.'s dielectric gel DP. 2630 for high viscosity liquid interlayers.

Some interlayer materials, such as the above-mentioned dielectric gel DP. 2630, require curing when in position between the rigid layers 10 and 13 in order to achieve the high viscosity liquid state. It has been found that certain materials suitable for the rigid layers, such as acrylic, can inhibit the curing of at least some of the suitable interlayer materials and it is then necessary to coat each rigid layer, at least over the area in contact with the interlayer material, with a thin barrier layer, such as the layers 24 and 25, of a suitable material to prevent chemical interaction occurring between the rigid layers and the interlayer material, both during curing and in service thereafter. If an electrical heating film, such as the film 19, is provided on the inner surface of the layer 13 in contact with the interlayer material it may also be necessary to coat the film with a barrier layer.

Although the interlayer 12 is described above as being formed of PVB, clearly this interlayer could also be formed of a liquid material, barrier layers being provided on the adjacent surfaces of the layers 10 and 11 if necessary.

The frame 17 and the window are held together in the structure of the aircraft 20 by means of bolts 21 (only one of which is shown). Other edge details, such as an expansion bumper strip 22, are conventional in the art.

It has been explained above that the provision of a liquid interlayer eliminates the delamination problem. There is also a further possible advantage of the invention in that differential expansion, bending, etc. of the rigid layers does not apply as large a force to the outer rigid layer 13 as would be the case if a conventional interlayer material were used. The layer 13 may therefore be a thinner layer of material than would othewise be necessary, or may be formed of a material with a lower strength than would otherwise be necessary.

It is to be understood that the term liquid used in the appended claims means a low-viscosity or a high viscosity liquid.

I claim:

1. A laminated structure including two substantially rigid layers with an interlayer of liquid of silicone material between them, means for maintaining the substantially rigid layers a predetermined distance apart, said substantially rigid layers being arranged for limited free movement relative to each other except in the direction of restraint by said means, and said silicone material having the characteristic property of remaining in intimate contact with the adjacent rigid layers so as to prevent air entering at interfaces thereof, said means for maintaining the substantially rigid layers a predetermined distance apart including a frame arranged to resist separation of said substantially rigid layers, a clearance space being provided within the said frame to allow relative movement of said substantially rigid layers in a direction substantially parallel to the adjacent surfaces of the substantially rigid layers, and means to exclude moisture from said space, said means to exclude moisture comprising a block of a waterproof, flexible, unicellular foam material substantially filling said space.

2. A structure as claimed in claim 1, in which the interlayer material is inserted between said substantially rigid layers and is cured to form a high-viscosity liquid interlayer.

3. A structure as claimed in claim 1, in which the interlayer is formed of a water-white silicone material.

4. A structure as claimed in claim 1, in which those surface of the substantially rigid layers which are in contact with the interlayer include a barrier layer coating.

5. A structure as claimed 1, including sealing means for retaining the interlayer between the substantially rigid layers.

6. A structure as claimed in claim 1, in which the interlayer material remains substantially in a liquid state over a temperature range of approximately 120° C. to −60° C.

7. A structure as claimed in claim 1, in which the interlayer material remains in intimate contact with the adjacent surfaces of the substantially rigid layers, said material having relatively fixed viscosity and not appreciably changing with age or changes in atmospheric environment.

References Cited
UNITED STATES PATENTS

| 2,597,800 | 5/1952 | Hussman | 248—20 |
| 1,224,530 | 5/1917 | Goetzke | 161—45 |
| 2,887,424 | 5/1959 | Langberg | 161—1 |
| 3,061,490 | 10/1962 | Ryan | 161—193 |
| 3,312,574 | 4/1967 | Laur | 161—193 |
| 3,398,040 | 8/1968 | Allen et al. | 161—45 |
| 3,470,049 | 9/1969 | Reusch | 161—45 |

DOUGLAS J. DRUMMOND, Primary Examiner

U.S. Cl. X.R.

161—45, 193, 206